US006748129B2

United States Patent
Braun et al.

(10) Patent No.: US 6,748,129 B2
(45) Date of Patent: Jun. 8, 2004

(54) METHOD AND APPARATUS OF MONITORING OPTICAL POWER LEVEL IN WAVEGUIDING STRUCTURES

(75) Inventors: Linda M. Braun, Chatham, NJ (US); Jane D. LeGrange, Princeton, NJ (US); Alexandru Paunescu, Neshanic Station, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 61 days.

(21) Appl. No.: 10/081,350

(22) Filed: Feb. 22, 2002

(65) Prior Publication Data

US 2003/0161569 A1 Aug. 28, 2003

(51) Int. Cl.[7] ............................. G02B 6/00; G02B 6/42; G01K 17/00
(52) U.S. Cl. ........................... 385/12; 385/42; 385/137; 374/32
(58) Field of Search ........................ 250/227.11, 277.14; 372/29.01, 29.02, 29.014, 29.021; 385/12, 134, 147, 42, 136, 137; 374/31–33

(56) References Cited

U.S. PATENT DOCUMENTS

| 4,362,057 A | * | 12/1982 | Gottlieb et al. ............... 385/12 |
| 4,576,485 A | * | 3/1986 | Lambert ...................... 356/43 |

* cited by examiner

Primary Examiner—Brian Healy
Assistant Examiner—Omar Rojas

(57) ABSTRACT

In accordance with the invention, the optical power level in an optical waveguide is monitored by enclosing a length of the waveguide within an insulated cavity of comparable length and cross section, measuring a first temperature $T_1$ within the cavity, measuring a second temperature $T_2$ outside the cavity and deriving from the difference, $T_1-T_2$, a measure of the optical power level. Exemplary apparatus for monitoring the optical power level in an optical waveguide comprises a substrate with an insulated groove for receiving an optical fiber, an insulated lid for sealing the fiber within the groove, and internal and external temperature sensors.

7 Claims, 1 Drawing Sheet

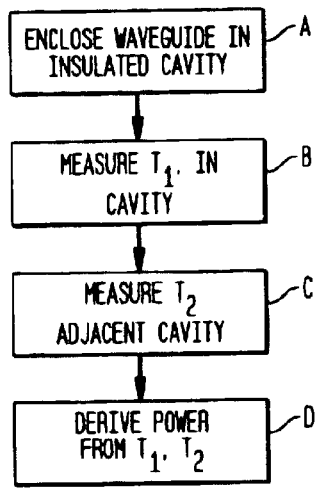
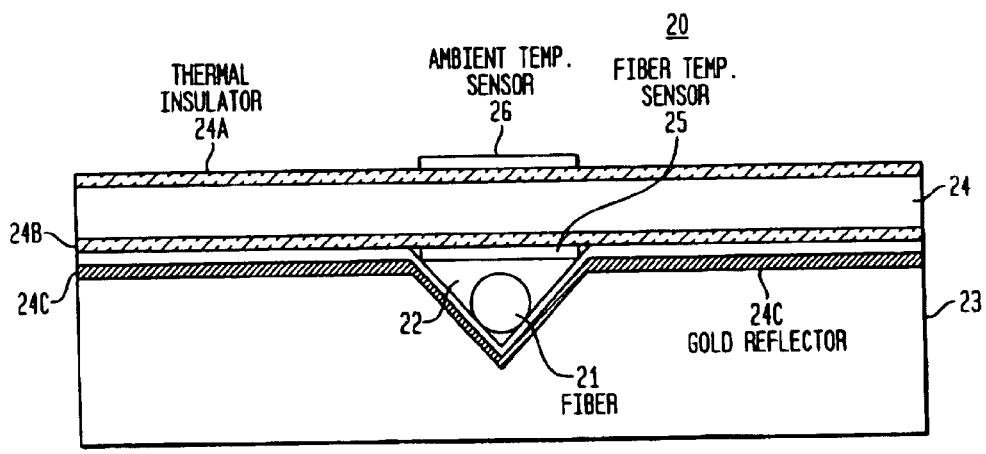

METHOD AND APPARATUS OF MONITORING OPTICAL POWER LEVEL IN WAVEGUIDING STRUCTURES

GOVERNMENT CONTRACT

This invention was made with government support. The government has certain rights in this invention.

FIELD OF THE INVENTION

This invention relates to a method and apparatus for monitoring optical power in waveguiding structures such as optical fibers and, in particular, to monitoring such power levels by the heat they generate.

BACKGROUND OF THE INVENTION

Optical waveguides are important for a wide variety of applications including the transmission of optical signals for optical communication systems and optical power for pumping lasers and optical amplifiers.

An optical waveguide typically comprises an inner core region of transparent material having a first index of refraction and a peripherally surrounding cladding region of material having a lower index of refraction. A light beam entering the core within the waveguide acceptance angle is guided along the core by total internal reflection from the core/cladding interface. The waveguide is typically optical fiber.

Monitoring the level of optical power in a waveguide is important in a number of practical applications. For example, in optical communication systems, the amount of amplification provided to a transmitted signal depends in part on the level of optical pump power provided to a rare-earth doped waveguide amplifier. The optical pump power is typically provided by a semiconductor diode and transmitted from the diode to the amplifier by a length of waveguide.

Methods of monitoring the diode directly are not reliable. Methods based on measuring the power to or from the diode theoretically can measure the pump light generated but do not provide an accurate measure of the generated light actually launched into the transmitting waveguide.

Alternative methods based on coupling pump light out of the transmitting waveguide are also disfavored. First, they produce undesirable optical loss. Second, they are sensitive to fluctuations in the polarization of light in the waveguide. Accordingly there is a need for an improved method of monitoring optical power in a waveguide.

SUMMARY OF THE INVENTION

In accordance with the invention, the optical power level in an optical waveguide is monitored by enclosing a length of the waveguide within an insulated cavity of comparable length and cross section, measuring a first temperature $T_1$ within the cavity, measuring a second temperature $T_2$ outside the cavity and deriving from the difference, $T_1-T_2$, a measure of the optical power level. Exemplary apparatus for monitoring the optical power level in an optical waveguide comprises a substrate with an insulated groove for receiving an optical fiber, an insulated lid for sealing the fiber within the groove, and internal and external temperature sensors.

BRIEF DESCRIPTION OF THE DRAWINGS

The nature, features and advantages of the invention can be understood by consideration of the embodiments shown in the accompanying drawings. In the drawings:

FIG. 1 is a schematic flow diagram of the steps in monitoring the level of optical power in an optical waveguide; and FIG. 2 is a schematic cross section of exemplary apparatus for practicing the method of FIG. 1.

It is to be understood that these drawings are for purposes of illustrating the concepts of the invention and are not to scale.

DETAILED DESCRIPTION OF THE DRAWINGS

Referring to the drawings, FIG. 1 is a schematic flow diagram showing the steps involved in monitoring the level of optical power in a waveguide. The first step shown in Block A is to enclose a length of the waveguide within an insulated cavity.

FIG. 2 illustrates apparatus 20 for monitoring an optical waveguide, here an optical fiber 21. The fiber 21 is disposed within a cavity formed by a V-shaped groove 22 within a substrate 23 and a lid 24. The groove and the lid are insulated by thermally insulating layers 24A, 24B and 24C. The length of groove 22 (into the paper) is approximately equal to the sample length of fiber 21 to be monitored and the cross sectional area of cavity formed by the groove and lid is advantageously less than twice that of the fiber. The substrate and lid can conveniently be monocrystalline silicon. The insulating layers can be thermally grown oxide, and the oxide within the groove is advantageously coated with a reflective metal layer, such as a thin layer of gold, to minimize light loss from the fiber.

The next step, shown in FIG. 1, Block B, is to measure a first temperature $T_1$ within the cavity. Advantageously $T_1$ is an average of the temperature along the length of the cavity.

Referring to the apparatus of FIG. 2, $T_1$ can be conveniently measured by an elongated temperature sensor 25 which can be secured to lid 24 above groove 22. The sensor 25 can be a temperature sensitive resistor or a thermocouple.

The third step (Block C of FIG. 1), is to measure a second temperature $T_2$ outside the cavity but preferably adjacent to the cavity.

$T_2$ can be measured by a second elongated sensor 26 which can be secured to lid 24 parallel to groove 22 on the outside of the lid.

The final step shown as Block D of FIG. 1 is to derive a measure of the optical power passing through the waveguide based on the difference between $T_1$ and $T_2$. To a first approximation, the optical power is proportional to $T_1-T_2$, but calibration can include higher order powers of this difference.

The temperature difference occurs due to heat generated in the fiber due to absorption and scattered light. The scattered light is also absorbed. For example, light is absorbed by the SiOH bonds on the surface and by contaminants. The absorbed light and the resulting temperature rise in the fiber will be directly correlated with the power in the fiber.

The invention can now be more clearly understood by consideration of the following specific example.

EXAMPLE

A cladding pump device, either a laser or amplifier, consists of diode pumps coupled into a multimode fiber that is then spliced to either a grating fiber (in the case of a laser) or an amplifier fiber. The multimode fiber is placed in a v-groove on a silicon chip. The v-groove consists of an insulating oxide layer on the surface. This layer is coated with a thin film of a metal for the purpose of reflecting light back into the fiber, thereby adding to the heat generated. The top chip, which is affixed to the bottom chip with the fiber sandwiched between them, has thin film metal resistor lines defined on its upper and lower sides. The fiber can be placed in the v-groove either at a splice (where there is more scattered light) or anywhere along the fiber.

It is to be understood that the above-described embodiments are illustrative of only a few of the many possible specific embodiments, which can represent applications of the principles of the invention. Numerous and varied other arrangements can be readily devised by those skilled in the art without departing from the spirit and scope of the invention.

What is claimed is:

1. A method of monitoring a level of optical power in an optical waveguide comprising the steps of:

enclosing a length of the optical waveguide within an insulated cavity;

measuring the temperature $T_1$ within the cavity;

measuring the temperature $T_2$ outside the cavity; and determining the level of optical power in the waveguide based on the temperature difference $T_1-T_2$.

2. The method of claim 1 wherein the temperature $T_1$ is measured over the length of waveguide.

3. The method of claim 1 wherein the temperature $T_2$ is measured over the length of the waveguide.

4. The method of claim 1 wherein the optical waveguide comprises an optical fiber and the walls of the cavity comprise a groove within a substrate and a lid.

5. Apparatus for monitoring a level of optical power in an optical waveguide comprising:

a substrate and lid forming therebetween an elongated insulated cavity for containing the optical waveguide, the cavity having a cross sectional area less than twice that of the waveguide;

a first temperature sensor for measuring the temperature along the waveguide within the cavity; and a second temperature sensor for measuring the temperature along the waveguide outside the cavity.

6. The apparatus of claim 5 wherein the waveguide comprises an optical fiber and the cavity comprises a groove in the substrate.

7. The apparatus of claim 5 wherein the substrate comprises monocrystalline silicon.

* * * * *